United States Patent

[11] 3,612,839

| [72] | Inventors | John E. DeWitt |
| | | Lake Oswego, Oreg.; |
| | | David A. Spitz, Columbus, Ohio |
| [21] | Appl. No. | 682,402 |
| [22] | Filed | Nov. 13, 1967 |
| [45] | Patented | Oct. 12, 1971 |
| [73] | Assignee | Industrial Nucleonics Corporation |

[54] VARIANCE PARTITIONING
70 Claims, 5 Drawing Figs.

[52] U.S. Cl. ........................................... 235/151.35,
73/73
[51] Int. Cl. ........................................... G01n 25/56,
G06f 7/38
[50] Field of Search ........................................... 235/151.35,
151.3, 151, 183; 73/73; 250/83.3 D; 18/2 I

[56] References Cited
UNITED STATES PATENTS

| 3,007,052 | 10/1961 | Hickman et al. | 250/83.3 |
| 3,067,939 | 12/1962 | Ziffer | 235/183 |
| 3,190,261 | 6/1965 | Ziffer | 235/151 X |
| 3,191,015 | 6/1965 | Hansen et al. | 235/183 |
| 3,212,127 | 10/1965 | Flook, Jr. et al. | 18/2 I |
| 3,248,545 | 4/1966 | Hansen | 250/83.3 |
| 3,471,685 | 10/1969 | Bishop | 235/151.13 |

OTHER REFERENCES

Techniques for Real-Time Determination of the Components of Variance for Control of Continuous-Sheet Process; Albert B. Bishop; IEEE Transactions on Automatic Control; October 1963; pp. 321–326

Primary Examiner—Malcolm A. Morrison
Assistant Examiner—Edward J. Wise
Attorneys—Lowe and King, William T. Fryer, III, C. Henry Peterson and James J. O'Reilly ABSTRACT: Disclosed are a system for and method of dividing or partitioning the total variance properties of a moving sheet into the components of: cross direction; long-term machine direction; short-term machine direction; total machine direction; cross direction; and profile. A single detector for the property is scanned at right angles to the sheet edges a plurality of times. During each scan the property is sampled a plurality of times to derive a profile contour. A computer responds to the sampled values to derive the variance components.

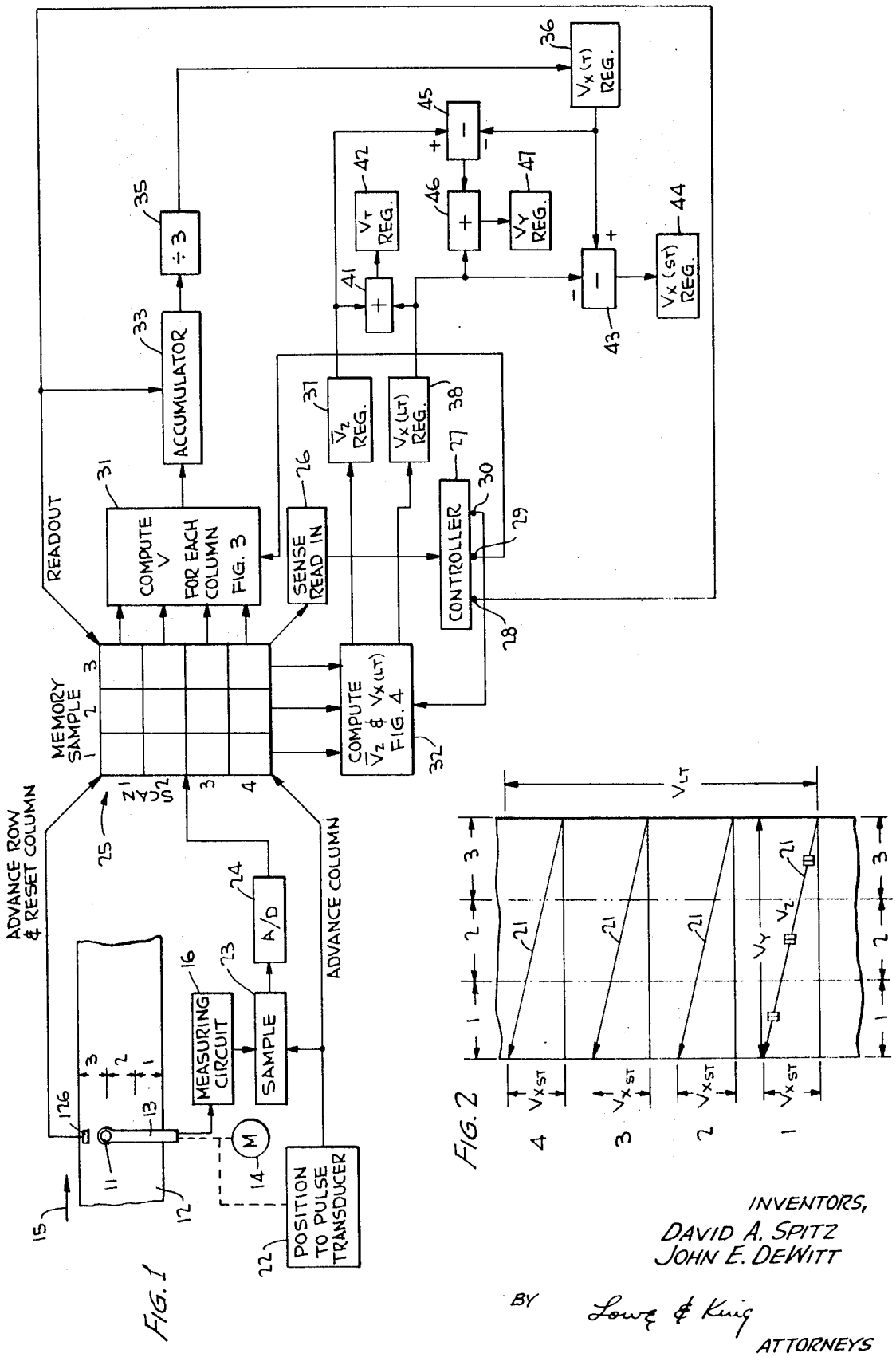

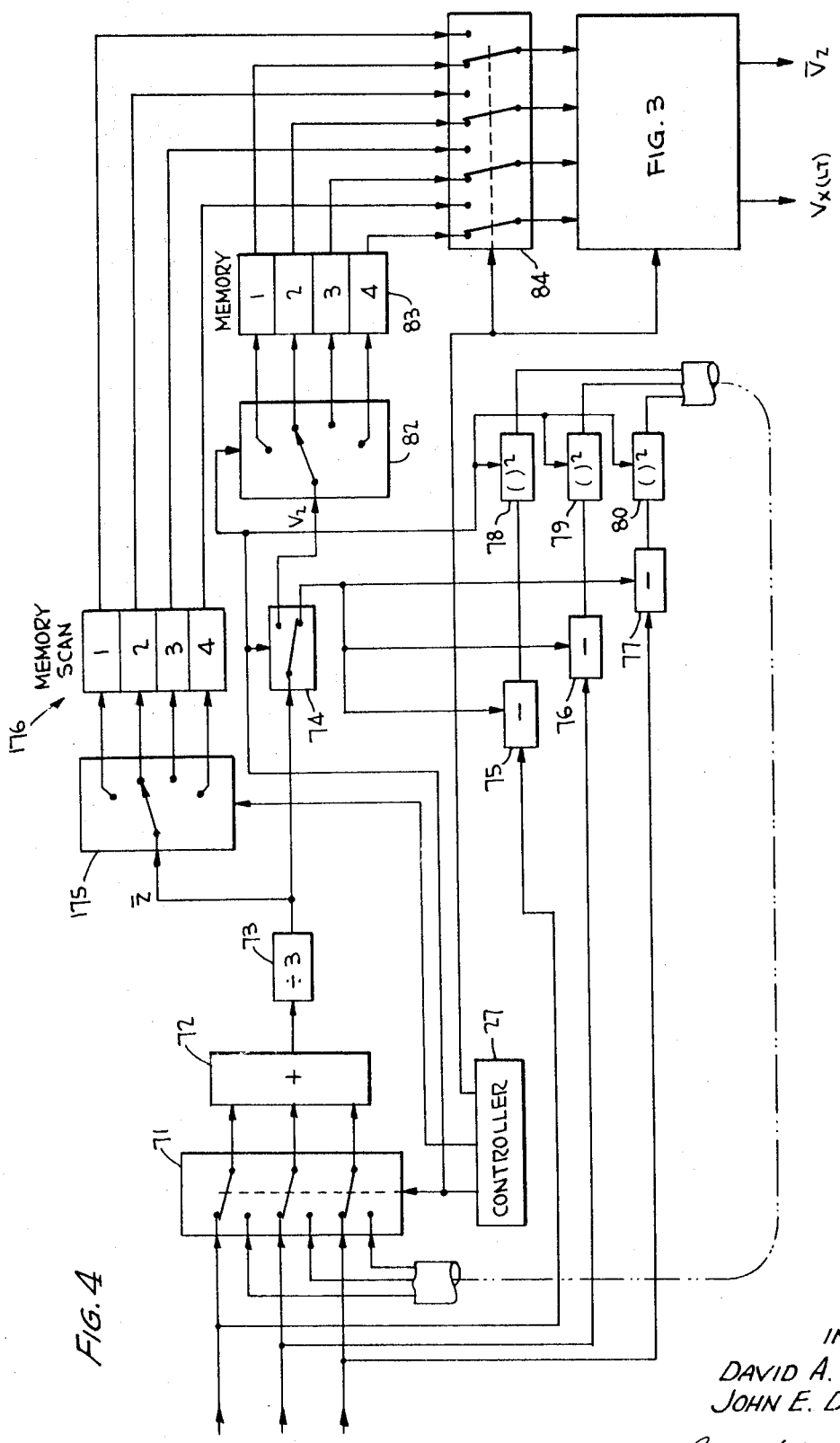

VARIANCE PARTITIONING

The present invention relates generally to a system for and method of deriving statistical data regarding the properties of a moving sheet, and more particularly to a system for and method of partitioning a property of a moving sheet into a plurality of individual variance components.

The variance or deviation from the means of a function $f(t)$ over a time interval, T, is defined as:

$$V = \delta^2 = \frac{1}{T}\int_0^T [f(t) - \overline{f(t)}]^2\, dt \quad (1),$$

where:

$V$ is variance;

$\delta$ is standard deviation, and $$\overline{f(t)} = \frac{1}{T}\int_0^T f(y)\, dt.$$

If the function $f(t)$ is sampled N times during the interval T, equation (1) can be rewritten as:

$$\frac{1}{N}\sum_{i=1}^{N}(x_i - \bar{x})^2 \quad (2),$$

where:

$X_i$ is successively each of the sampled values, and $$\bar{x} = \frac{1}{N}\sum_{i=1}^{N} x_i.$$

In industrial processes, the computation of the variance of a property has been widely used to determine whether a manufactured product has a desired consistency to achieve a balance between factors of economy and customer satisfaction. The use of variance has been extensive in sheet-manufacturing arts, such as paper making, steel fabrication, and plastic film manufacture. Generally in the prior sheet manufacture art, and in accordance with a preferred embodiment of the present invention, variance is calculated in response to translating a detector for the property of interest at right angles to the sheet edges while the sheet is moving in a longitudinal direction. Such a detector scan results in a measurement usually referred to as a profile.

In the prior art, it has been generally assumed that the profile data could be utilized directly for deriving statistical information regarding cross direction characteristics of the measured property. In the art, data regarding characteristics at right angles to the sheet edges and in the direction of sheet movement are usually referred to as cross direction and machine direction properties, respectively.

In actuality, however, the profile and cross direction characteristics cannot be considered as equivalent. Lack of equivalency between the profile and cross direction components results from machine direction translation of the sheet while the detector scans at right angles to the sheet. Hence, a profile measurement actually includes machine direction and cross direction components of the property being measured. An actual indication of cross direction properties can only be derived by separating or partitioning the machine and cross direction components into their respective parts.

Components of the sheet property include a wide range of frequencies. For example, in the papermaking art, factors are present whereby the weight per unit area of the sheet, termed basis weight, may vary over a frequency range of 0.01–100 Hertz. In general, the frequency spectrum of the sheet characteristics can be divided into long- and seort-term components, wherein long-term components have a periodicity in excess of one scan of a detector across a sheet and short-term components are those having a periodicity less than one scan of a detector.

In accordance with the present invention, the variance of the properties of a sheet are partitioned into components of: cross direction, long-term machine direction, short-term machine direction, total machine direction, and profile. The components are computed in response to a single detector for the property scanning the sheet at right angles to the edges thereof a plurality of times. During each scan, the property measurement is derived at a number of zones across the sheet to derive a profile contour. A computer responds to the sampled values to derive the variance components indicated.

The present invention partitions the variance components into their several values in response to the profile measurement by relying upon the unexpected result that total variance of a sheet over a plurality of scans is equal to the sum of the variances over those scans, whereby total variance equals the average of the profile variances over the several scans plus the long-term variance in the machine direction. Stated mathematically, total variance is:

$$V_T = \overline{V}_z + V_{x(LT)} \quad (3),$$

where:

$V_T$ = total variance, $\overline{V}_z$ = the average of the profile variances, and $V_{x(LT)}$ = long-term variance in short-term machine direction over the plurality of scans.

Since profile variance is the sum of cross direction and short-term machine direction variances and total machine direction variance equals short-term plus long-term machine direction variances, equation (3) can be rewritten as:

$$V_T = V_Y + V_{x(T)} \quad (4),$$

where:

$V_Y$ = cross direction variance, and $V_{x(T)}$ = total machine direction variance.

The long-term machine direction variance in equation (3) is found by calculating the average value of the machine property for each of the scans and computing the variance of these average values. Mathematically, the long-term machine direction variance is computed as:

$$V_{x(LT)} = \frac{1}{n}\sum_{i=1}^{n}(\bar{Z}_i - \bar{\bar{Z}})^2 \quad (5),$$

where:

$n$ is the number of scans, $\bar{Z}_i$ is the average value of the $i$th scan, $\bar{\bar{Z}}$ is the average of the $n$ averages of the detected scan readings, and $i$ is successively every integer between one and $n$.

To determine total variance in the machine direction, the variance in each of the N zones for the $n$ scans is derived. These N variances are then averaged together to obtain the value of $V_{x(T)}$.

From the measurements of total machine direction and long-term machine direction variance, the short-term machine direction variance, $V_{x(ST)}$, of the property can be calculated as:

$$V_{x(ST)} = V_{x(T)} - V_{x(LT)} \quad (6).$$

The factors utilized for computing short-term machine direction variance can be combined with profile variance measurements to derive an accurate indication of cross direction variance in accordance with:

$$V_Y = V_z - V_{x(T)} + V_{x(LT)} \quad (7).$$

By partitioning the total process variance of the measured property into its several components, information concerning the source of variations causing inconsistencies in the sheet is derived. For example, by knowing the value for true cross machine variation, the effects of controls for cross machine direction properties can more accurately be determined. Knowledge regarding short-term machine direction components with considerable accuracy enables better evaluation of the effects of machine direction process adjustments. In the paper manufacture art, evaluating true cross machine variance enables a more accurate indication to be derived of how changing the opening of a head box slice at a particular point across the sheet controls basis weight in the cross direction. The short-term machine direction variance computation provides a more complete appraisal of machine direction process adjustments, such as wet end tuning.

An important advantage of the present invention is that property values at different cross direction points are utilized in determining machine direction and total variances. In the prior art, it has been generally assumed that machine direction variance is constant as a function of cross direction position. It appears that this assumption is erroneous and, in accordance with one aspect of the invention the calculation of total and long-term machine direction variances are derived in response to measurements from several zones across the sheet.

It is, accordingly, an object of the present invention to provide a new and improved system for and method of calculating statistical properties of a moving sheet.

Another object of the present invention is to provide a new and improved system for accurately partitioning variance components of a property of a moving sheet into its constituent components.

An additional object of the present invention is to provide a new and improved system for and method of measuring cross direction property components of a moving sheet.

Still another object of the present invention is to provide a new and improved system for and method of measuring machine direction variance of a property of a moving sheet.

Still another object of the present invention is to provide a system for and method of calculating the total variance of a property of a moving sheet by relying upon the surprising result that total variance of the sheet equals the sum of the constituent variance components.

An additional object of the present invention is to provide a system for and method of calculating long-term and short-term machine direction variance of the properties of a moving sheet.

The following detailed description of the present invention is made in conjunction with a system for measuring basis weight of a paper sheet during manufacture. It is to be understood, however, that the process and apparatus of the present invention can be utilized with other types of materials and for measuring properties other than basis weight. For example, the present invention can be employed for measuring the basis weight of extruded plastic films or rolled steel, or for determining moisture properties of a paper sheet during manufacture.

The above and still further objects, features and advantages of the present invention will become apparent upon consideration of the following detailed description of several specific embodiments thereof, especially when taken in conjunction with the accompanying drawings, wherein:

FIG. 1 is a block diagram of a computer in accordance with the present invention, in combination with apparatus for measuring basis weight properties of a paper sheet during manufacture;

FIG. 2 is a diagrammatic view illustrating the manner in which a basis weight detector, of the type employed in FIG. 1, is utilized for scanning a paper sheet a plurality of times;

FIG. 4 is a block diagram of the apparatus utilized in FIG. 1 for computing profile and long-term machine direction variances.

Figure 3:
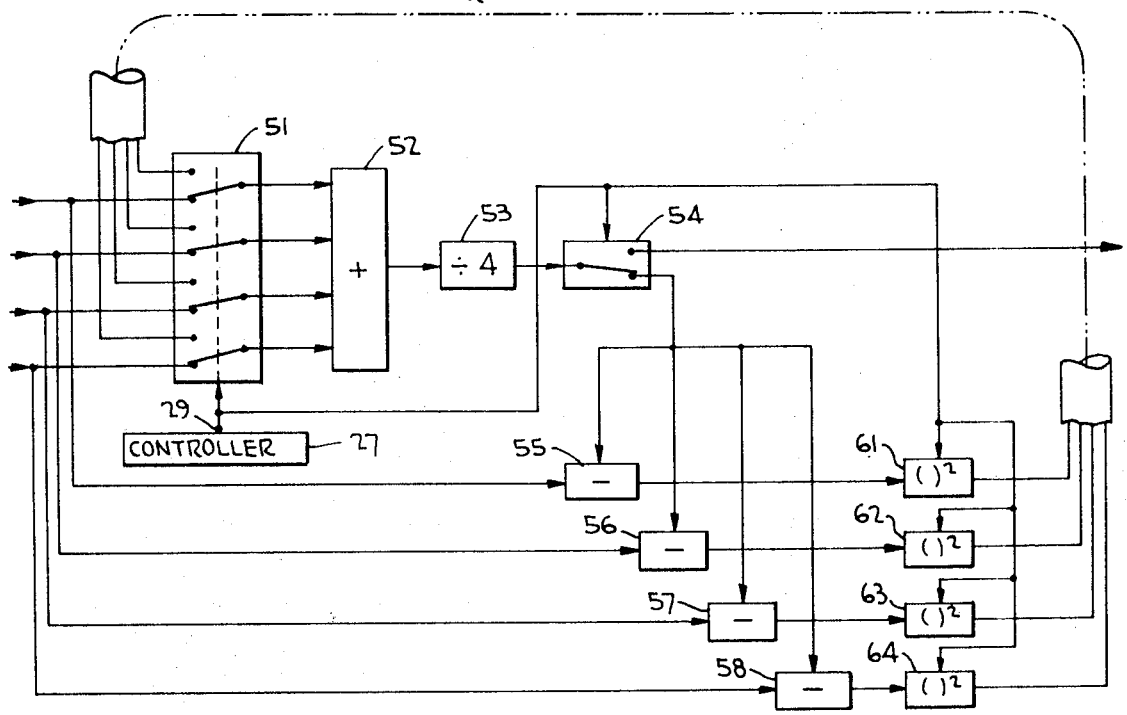
FIG. 3 is a block diagram of the apparatus utilized in FIG. 1 for computing the variance for each zone position across the scanned sheet.

Reference is now made to FIG. 1 of the drawings, wherein nuclear radiation gauge 11 for measuring basis weight of paper sheet 12 is illustrated as being positioned at one end of bracket 13. Bracket 13 and gauge 11 are translated at right angles to the edges of sheet 12 by motor 14. Sheet 12 is translating in a direction along its longitudinal axis, as indicated by arrow 15, whereby the position of gauge 11 for one scan thereof defines a locus of points equal to the hypotenuse of a triangle, having first and second legs commensurate with the forward movement of sheet 12 during any scan and the width of the sheet, respectively.

The electrical signal derived from gauge 11, indicative of the basis weight of sheet 12 for the region covered by the gauge, is coupled to measuring circuit 16. Measuring circuit 16 is of the well-known type, developing a DC output voltage proportional to the basis weight signal derived from gauge 11.

According to the present invention, gauge 11 is scanned at right angles to the edges of sheet 12 a plurality of times to derive signals commensurate with the variance components of: short-term machine direction; long-term machine direction; total machine direction; profile; cross direction; and total. The signals indicative of the variance components are derived with the digital computer apparatus illustrated in the remainder of FIG. 1 and in FIGS. 3 and 4.

Before considering the computer apparatus of the present invention, reference is made to the diagrammatic illustration of FIG. 2, wherein the manner in which data are derived from gauge 11 for a plurality of scans is illustrated. In FIG. 2 and the reminder of the detailed description of the present invention, it is assumed that sheet 12 is divided into three transverse or cross direction zones and that gauge 11 is scanned across the sheet four times to derive the required data. In an actual system, the number of sampling zones across sheet 12 and the number of scans of detector 11 required to determine the data of interest are considerably greater than the quantities given in the example. The number of cross direction zones and samples has been reduced in describing the invention to simplify the consideration of the electronics and provide a more complete understanding of the invention.

In a typical case, there may be 21 scans of detector 11 across sheet 12, and during each scan data may be derived from 15 different sampling zones. The actual number of scans and the number of sampling zones employed in a particular computation will depend on the parameters of the process and the gauging device as well as the use to be made of the computed variance information. Obviously the sheet width, the scanning speed, the response time of the gauge, the physical dimensions of the "window" which determines the size of the sheet portion viewed by the gauge at a particular instant, and the variation frequencies to be resolved in the variance computations must all be taken into account.

In the illustrative case shown in FIG. 2 and the following description, it is considered that data is taken on successive scans to make the variance information available as quickly as possible for purposes such as guiding the operator in the wet end tuning of a papermaking machine. In this case, the data from, say, 21 scans may be accumulated and the variance components computed in perhaps 20 or 30 minutes. However, it is not necessary that data be taken on every scan, or on successive scans. In a long run evaluation, for instance, the data may be taken on, say, 21 scans selected at random during a period of several hours or even several days. It is to be appreciated that the values for the corresponding computed variance components obtained in the long run evaluation will generally be different from the values obtained in the short-run evaluation.

Considering FIG. 2, each scan of gauge 11 across sheet 12 wherein data are derived is indicated by diagonal lines 21. It is noted that there is a separation between the beginning and end of adjacent diagonal lines, which separation arises because of the finite time required to return gauge 11 to its initial starting point. As is the general custom in measuring sheet properties with scanning gauges, measurements are derived from gauge 11 only as it is translated in one direction across sheet 12. Each scan of gauge 11 across sheet 12 results in measuring circuit 16 deriving a profile indication of basis weight of the regions defined by diagonal lines 21. From these profile measurements, which include property information in the cross and machine directions, the variance components mentioned supra are calculated.

During each scan of detector 11 across sheet 12, there are detected machine direction basis weight variations. The machine direction variations during a scan of detector 11 are of relatively high frequency, i.e. short duration, and a measure thereof can be expressed as a short-term machine direction variance $V_{x(ST)}$. By calculating the short-term machine direction and profile variances for each scan, an accurate indication of cross direction variance, $V_y$, for that scan can be derived by subtracting profile variance from short duration machine direction variance. The calculation of short duration machine direction variance for one scan is not readily performed. Average short duration machine direction variance over the several scans can be ascertained by computing total machine direction and long-term machine direction variances, and subtracting the latter from the former. The average short-term machine direction variance is employed for calculating the average cross direction variance over the several scans.

To calculate long-term machine direction variance, the variance resulting from four scans of detector 11 across sheet 12, the profile measurements of each of the four scans are averaged and the variance of these four averages is calculated. Total machine direction variance is found by computing the variance in each of the three zones for the four scans and then averaging these three variances. In other words, total variance is found by computing the variance in zone 1 for the four scans; the variance for zone 2 for the four scans; and the variance of zone 3 for the four scans. These three variance factors are averaged together to provide an indication of total machine direction variance.

Calculation of cross direction variance and total machine direction variance enables the total variance of the sheet covered by the four scans of detector 11 to be derived as $V_r = V_y + V_{x(T)}$. In the alternative, total variance can be calculated by adding profile variance with long-term machine direction variance since profile variance equals cross direction variance plus short-term machine direction variance; and total machine direction variance, in turn, equals the sum of short-term machine direction variance and long-term machine direction variance.

Because of the storage problems involved in computing the various variance components, it is preferred that a digital computer be utilized. To this end, the output of measuring circuit 16 is sampled during the passage of gauge 11 over the center of each of the three zones across the width of paper sheet 12. Sampling is accomplished by coupling the output shaft of motor 14 to position to pulse generating transducer 22, that generates an output pulse while gauge 11 is in the center of each of the three zones. The pulse from transducer 22 is applied to sampling gate 23, that couples the output of measuring circuit 16 to the input of analog-to-digital converter 24.

Many of the digital computer components utilized in the system of the present invention, e.g. converter 24, derive parallel multibit words that require a bus having a plurality of leads. To simplify the drawing and description, each bus carrying a parallel multibit word is shown as a single lead.

Analog-to-digital converter 24 responds to the sampled DC voltage fed thereto to derive a multibit word commensurate with the basis weight signal derived from measuring circuit 16. The output of analog-to-digital converter 24 is applied to memory 25, having a number of cells equal to the product of the number of sampling zones across sheet 12 and the number of scans of detector 11 required to derive meaningful variance data. In the present example, memory 25 has 3×4=12 cells, each having a capacity to store one multibit word generated by analog-to-digital converter 24.

While gauge 11 is deriving basis weight signals as it scans across sheet 12, memory 25 is activated to a write-in status. Upon completion of the four scans of gauge 11 across sheet 12, all of the data stored in memory 25 are read out into the remainder of the computer of FIG. 1 to provide indications of the desired variance components.

To write information into memory 25, the output of position to pulse transducer 22 is coupled as an advance column input to the memory. Thereby, as gauge 11 crosses each zone of sheet 12, data are read into a different column of memory 25. Control of the four rows of memory 25 being fed with data is in response to an output derived from microswitch 126, positioned at the edge of sheet 12 remote from the initial scanning point of gauge 11. As gauge 11 completes a scan across sheet 12, microswitch 126 derives a binary one signal that is coupled to an advance row input of memory 25. Memory 25 includes circuitry for resetting the column reading position thereof from the third to the first column in response to each binary one input signal applied to its advance row input. Thereby, upon the completion of each scan of gauge 11 across sheet 12, the row of memory 25 into which data are being written is advanced and the memory cell responsive to input data always corresponds with the position of gauge 11 in the machine direction and cross direction of sheet 12.

After data have been written into the cell of memory 25 corresponding to the third column and fourth row thereof, the computer for determining the variance components is activated. To this end, sense reading network 26 is connected to the cell of the third column and fourth row to generate an output signal in response to data being read into that memory position. Sense readin network 26 derives an output pulse that activates controller 27 to initiate computation. Sufficient delay is provided in controller 27 after receiving a pulse from sense readin network 26 whereby the controller operation is not initiated until the entire word has been read into the third column, fourth row memory cell.

Controller 27 includes three primary output terminals 28, 29 and 30, respectively connected to control: readout of memory 25, variance computer 31, and variance computer 32. Controller 27 includes an internal clock pulse source and a shift register responsive to the clock source for sequentially deriving control signals to read the contents of memory 25 into computers 31 and 32.

The first readin operation involves nondestructively reading out in parallel the four basis weight profile signals stored in each of the columns into variance computer 31. The contents of each column are read in sequence into computer 31, so that the computer is energized through 3 cycles, one for each memory column. To these ends, controller 27 applies a signal to a readout input terminal of memory 25, whereby the four signals stored in the first column of the memory are simultaneously read into variance computer 31. Variance computer 31 responds to the four signals simultaneously applied thereto to derive a digital, multibit word that is fed to accumulator 33. After the contents of the first column of the memory are read into computer 31, controller 27 is activated to read the four words in the second column into computer 31. The computer responds to these four words to derive a second, multibit word indicative of variance of the four words supplied thereto. The second output of computer 31 is added to the word stored in accumulator 33 resulting from the first variance computation by computer 31. After the cells of the second column of memory 25 have been read out, the cells of the third column are fed to variance computer 31, that derives a third variance signal. The third variance signal is added to the first two variance signals in accumulator 33.

After the three columns of memory 25 have been read in sequence into computer 31 and the three sequentially derived, multibit signals generated by the computer are fed into accumulator 33, the average of the variance for each zone position across sheet 12 is derived by feeding the output of accumulator 33 into divider matrix 35 in response to an output from controller 27. Divide-by-three matrix 35 is prewired to generate a multibit, digital signal commensurate with the average zone variance of sheet 12, which signal is fed to register 36. Register 36 thereby stores a binary, multibit word indicative of the total machine direction variance of sheet 12 for the four scans of gauge 11 across the sheet, $V_{x(T)}$.

After the date in the three columns of memory 25 have been read out, controller 27 is advanced, whereby the memory contents are read into the variance computer 32. Variance computer 32 includes three inputs, one responsive to each of the three columns of memory 25 and responds to the four rows of the memory in sequence. To compute the profile and long-term machine direction variances, signals are applied to computer 32 from memory 25 twice, once for each of the calculations.

In response to the first coupling of data from memory 25 to computer 32, the average of profile variance over the four scans, $\overline{V}_z$, is calculated. The average value of profile variance for the four scans is derived by computing each profile variance, then summing the four profile variances and dividing the resultant by four. The average profile variance signal is fed to register 37 in response to an output of controller 27, whereby the register provides and stores an indication of profile variance.

After the computation of profile variance has been completed, three simultaneous words are read from memory 25 to computer 32 in four sequential operations in response to signals from controller 27. Computer 32 responds to these 12 words and calculates long-term machine direction variance in accordance with equation 5, supra. In response to a signal derived from controller 27, the long-term machine direction variance indication is coupled from computer 32 to register 38, where it is stored.

With registers 36, 37 and 38 storing signals indicative of the variance components of: total machine direction; average profile; and long-term machine direction, respectively, the values of total variance, short-term machine direction variance, and cross direction variance are calculated in accordance with equations 3, 6 and 7. To this end, the profile variance and long-term machine direction variance signals stored in registers 37 and 38 are combined in adder matrix 41, the output of which is indicative of total variance and is fed to register 42. Short-term machine direction variance is calculated by supplying the contents of register 36 as a minuend input to prewired subtraction matrix 43, the subtrahend input of which is connected to the output of register 38. The difference signal derived from matrix 43, indicative of the short-term machine direction variance, is applied to register 44. The contents of registers 36 and 37 are respectively applied as the subtrahend and minuend inputs to the subtraction matrix 45, the output of which is an addend input to adder matrix 46. The augend input to matrix 46 is connected to be responsive to the output of register 38, whereby adder matrix 46 derives a binary word commensurate with the cross direction variance of sheet 12, as averaged over the four scans of detector 11. The binary word generated by adder matrix 46 is coupled to register 47. Thereby, registers 36, 37, 38, 42, 44 and 47 store and provide indications respectively indicative of the variance components of: total machine direction; average profile over the four scans of gauge 11; long-term machine direction over the four scans; total for the four scans of gauge 11; average short-term machine direction for the four scans; and average cross direction for the four scans.

Reference is now made to FIG. 3 of the drawings wherein there is illustrated a block diagram of the column variance computer 31 of FIG. 1. The computer of FIG. 3 responds to the four simultaneous outputs of memory 25, as derived from the columnar positions thereof. In response to each of the four simultaneous inputs thereto, the computer of FIG. 3 first calculates the average values thereof, subtracts each individual input value from the calculated average value, squares the resultant subtracted value and sums the squares. The sum of the squares is divided by four to provide a measure of variance.

The four simultaneous inputs to computer 31 are applied to adder matrix 52 through four pole, double throw, electronic switch 51, activated to the stated position in response to a signal from controller 27. Adder matrix 52 combines the four inputs thereof to derive a single, multibit binary output word, the value of which is divided by four in prewired, division matrix 53. While the average value of the four inputs to computer 31 is being calculated, the output of matrix 53 is coupled through electronic, single-pole, double-throw switch 54, controlled by the output voltage at terminal 29 of controller 27. The signals coupled through switch 54 are fed in parallel to subtrahend input terminals of prewired subtraction matrices 55-58. The minuend inputs of matrices 55-58 are respectively responsive to the words read from the four rows of memory 25 for the column being read out of the memory. Thereby, each of matrices 55-58 derives a digital, multibit word commensurate with the deviation from the average basis weight signal for a particular zone over the four scans of gauge 11 across sheet 12.

The four signals derived from matrices 55-58 are respectively applied to squaring matrices 61-64, each of which includes a scratch pad memory in its output. The different signals stored in the scratch pad memories of matrices 61-64 remain in the memories until controller 27 is activated to energize switch 54 so that the contents of divider matrix 53 are decoupled from the minuend inputs of subtraction matrices 55-58. When controller 27 is activated as stated, it energizes switch 51 whereby the contents of the scratch pad memories included within matrices 61-64 are coupled through the switch to adder 52 to the exclusion of the signals from memory 25.

Adder and division matrices 52 and 53 now respond to the four deviation signals applied thereto from the scratch pad memories included within squaring matrices 61-64, whereby there is derived from the normally open contact of switch 54 a binary signal commensurate with the variance of the four values for the zone being read from memory 25. The signal indicative of variance is coupled to accumulator 33, as indicated supra.

Upon the completion of each variance computation by computer 31 in response to signals from controller 27, the controller supplies a signal to memory 25, whereby the column being read from the memory is advanced. To advance a column of memory 25, controller 27 is returned to its initial state, activating switches 51 and 54 so that the contents of a second column of memory 25 are applied to adding matrix 52 and the output of division matrix 53 is coupled to subtraction matrices 55-58. Thus, computer 31 derives in sequence three multibit, binary words, each indicative of variance in each of the three zones across the width of sheet 12.

Reference is now made to FIG. 4 of the drawings, wherein there is specifically disclosed the apparatus utilized for computing average profile variance over the four scans of the gauge 11 and long-term machine direction variance. The computer of FIG. 4 responds to the output of controller 27 to derive average profile variance for each of the four scans and computes long-term machine direction variance after the profile variance computation has been completed.

The computer of FIG. 4 derives profile variance indications for each of the scans in a manner generally similar to computation of variance by computer 31. In particular, the three parallel, multibit words derived from each row of memory 25, in response to readout control signals from controller 27, are applied through triple pole, double throw switch 71 to adder matrix 72. Switch 71 includes two closed states, the first of which is energized by controller 27 initially during the profile variance computation. The sum of the sampled values for the three zones for each scan of gauge 11 across sheet 12 is derived from adding matrix 72 and applied to prewired, divide-by-three matrix 73, the output signal of which is indicative of the average profile basis weight for the scan being considered.

The average profile basis weight signal derived from matrix 73 is applied in parallel to electronic, single pole, double throw switch 74 and electronic multiplexing switch 175. Multiplexing switch 175 responds to signals from controller 27, whereby each average profile signal is applied to a different output of the switch, having a number of outputs equal to the number of scans of gauge 11 across sheet 12. Thereby, four signals are derived in sequence from switch 175, one for each of the average profile basis weight signals for the four scans of gauge 11. The four output signals of switch 175 are applied to scratch pad memory 176, having four cells, one responsive to each of the four outputs of the switch. Thereby the memory stores signals which can be utilized at a later time for computing long term machine direction variance.

To compute the value of profile variance, the average profile basis weight output signals of matrix 73 are applied through the normally closed contacts of switch 74 to subtrahend inputs of subtraction matrices 75–77. Subtraction matrices 75–77 include minuend inputs responsive to the three zone basis weight signals read from the row of memory 25 being read out whereby each of the subtraction matrices derives a multibit binary signal indicative of the deviation in basis weight from the average basis weight for a particular scan of gauge 11 across sheet 12. The deviation or difference signals derived from subtraction matrices 75–77 are respectively applied to squaring matrices 78–80, having in their outputs scratch pad memories that are read out in response to signals from controller 27.

The signals stored in the scratch pad memories of squares 78–80 are read out simultaneously with switch 71 being activated to decouple the output of memory 25 from adding matrix 72. When controller 27 activates switch 72 to decouple the output of memory 25 from adding matrix 72, the contents of the scratch pad memories included within squaring matrices 78–80 are coupled through the switch to the adder matrix. Simultaneously, single-pole, double-throw switch 74 is energized in response to the output of controller 27 and divider 73 feeds to the normally open contact of the switch a multibit binary word commensurate with profile variance for the scan being read from memory 25.

The profile variance signals coupled to the normally open contact of switch 74 are fed through electronic multiplexing switch 82, having four output leads, one for each of the four cells included within memory 83. Switch 82 is responsive to signals from controller 27, whereby each of the four profile variance signals derived from switch 74 is coupled to a different one of the four cells within memory 83. Thereby, after all four rows of memory 25 have been read into computer 32, the four cells of memory 83 store binary signals commensurate with the profile variances of the four scans of gauge 11 across sheet 12.

The system now calculates the average value for the four profile variances by coupling the outputs of memory 83 simultaneously through switch 84 to the averaging apparatus comprising FIG. 3. Switch 84 is controlled in response to an output signal from controller 27, whereby the signals in the four cells of memory 83 are coupled through switches 84 and 51, FIG. 3, to adder 52. Controller 27 now activates the switches of FIG. 3, whereby the average value signal derived from divider 53 is coupled to the normally open contact of switch 54, the output of which is now connected by a switch, not shown, to register 37.

After computation for the average profile variance over the four scans is completed, controller 27 is energized, whereby computer 32 and memory 25 are reset to calculate long-term machine direction variance. Long-term machine direction variance is calculated by feeding the four average value basis weight signals stored in memory 76 through switch 84 to the variance computer of FIG. 3 in response to signals from controller 27. The variance computer of FIG. 3 responds to the four average value profile basis weight signals stored in memory 76 to compute the variance thereof in exactly the same manner as indicated supra with regard to the computation of total machine direction variance. The long-term machine direction variance signal derived from FIG. 3 is coupled through a switch, not shown, in response to a signal from controller 27 to register 38.

It is to be understood that the computer of FIG. 3 can be utilized in FIG. 4 on a time division multiplex basis, as stated, or that the apparatus of FIG. 3 can be duplicated in the computer of FIG. 4.

Figure 5:
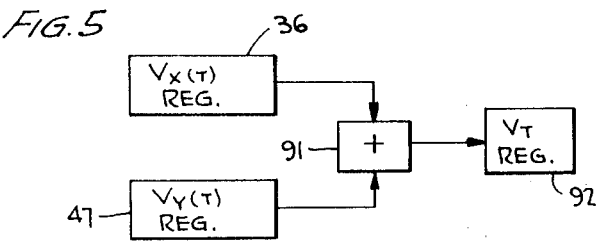
FIG. 5 is a block diagram of an alternate embodiment for a portion of the computer of FIG. 1.

An alternative embodiment for computing total variance, in lieu of the system illustrated by FIG. 1, is shown on FIG. 5. In the embodiment of FIG. 5, each of the variance components, other than total variance, is calculated as described in conjunction with FIG. 1 so no need exists for additional description or drawings thereof. Total variance is calculated in the FIG. 5 embodiment by adding total machine direction variance, as stored in register 36, with the cross direction variance signal in register 47. The contents of registers 36 and 47 are added together in adder matrix 91, the multibit output of which is fed to total variance register 92. Hence, the structure of FIG. 5 effectively provides the same result as is attained with adder 41 and register 42, FIG. 1.

While we have described and illustrated several specific embodiments of our invention, it will be clear that variations in the details of the embodiments specifically illustrated and described may be made without departing from the true spirit and scope of the invention as defined in the appended claims.

1. A method of determining the cross machine variance of a property of a sheet moving in a machine direction comprising scanning a single detector of the property a plurality of times at substantially right angles to the edges of the moving sheet, deriving from outputs generated by the detector over several scans of the scanning detector a response indicative of cross and machine direction variances of the property and responding only to outputs of the single detector at the time it is scanning to substantially eliminate the machine direction variance from said response to provide an indication solely of the cross machine variance.

2. The method of claim 1 further including the step of combining the property variances derived from several scans of the detector to provide an indication of the total variance over the scanned sheet region.

3. A method of determining the cross machine variance of a property of a sheet moving in a machine direction comprising scanning a single detector of the property a plurality of times at substantially right angles to the edges of the moving sheet, deriving from the scanning detector a response indicative of cross and machine direction variances of the property, and substantially eliminating the machine direction variance from the response to provide an indication solely of the cross machine variance, wherein variance in the machine direction is obtained by deriving signals commensurate with the value of the property at a plurality of zones across the sheet in response to each scan, and combining indications resulting from said signals to provide a measure of total variance of the property in the machine direction.

4. The method of claim 3 wherein the indications resulting from the signals are combined by calculating the variance in each zone over said plurality of scans, and averaging the zone variance.

5. The method of claim 3 wherein variance in the machine direction is further obtained by averaging the value of the property for each scan, and calculating the variance of the average values to provide an indication of long-term variance in the machine direction over said plurality of scans.

6. The method of claim 5 further including the step of calculating average machine direction variance for one scan by subtracting long-term machine direction variance for one scan by subtracting long-term machine direction variance from total machine direction variance.

7. The method of claim 1 wherein variance in the machine direction is derived by averaging the value of the property for several scans, and calculating the variance of the average values to provide an indication of long-term variance in the machine direction over said plurality of scans.

8. A method of determining the total variance of a property of a sheet moving in a machine direction comprising; while the sheet is moving, detecting the value of the property at a plurality of zones across the sheet at each of a multiplicity of noncontiguous locations along the moving sheet, deriving from the detected values signals indicative of the variances of the property in the cross machine and machine directions, and combining the signals to provide a measure of total sheet variance for the property over the detected sheet region.

9. The method of claim 8 wherein the property is detected by scanning a single detector across the zones substantially at right angles to the edges of the sheet a number of times equal to the multiplicity of locations.

10. A method of determining the total variance of a property of a sheet moving in a machine direction comprising; while the sheet is moving, detecting the value of the property at a plurality of zones across the sheet at each of a multiplicity of noncontiguous locations along the moving sheet, deriving from the detected values functions of the variances of the property in the cross machine and machine directions, and combining the functions to provide a measure of total sheet variance for the property over the detected sheet region, wherein one of said functions is total machine direction variance, the total machine direction variance being obtained by calculating the property variance in each zone over said multiple locations, and averaging the zone variances.

11. A method of determining the total variance of a property of a sheet moving in a machine direction comprising; while the sheet is moving, detecting the value of the property at a plurality of zones across the sheet at each of a multiplicity of noncontiguous locations along the moving sheet, deriving from the detected values functions of the variances of the property in the cross machine and machine directions, and combining the functions to provide a measure of total sheet variance for the property over the detected sheet region, wherein one of said functions is long term machine direction variance over the multiple locations, the long term machine direction variance being obtained by calculating the average value of the property at each of said locations, and computing the variance of the average values for all of said locations.

12. A method of determining the variance of a property of a sheet moving in a machine direction comprising scanning a detector of the property across the moving sheet a plurality of times substantially at right angles to the edges of the sheet, deriving a signal commensurate with a function of the value of the property for each scan of the detector across the sheet, and combining the signals resulting from several scans to derive an indication of long-term variance of the property in the machine direction.

13. The method of claim 12 further including the step of deriving an indication of variance of the property in the direction of movement of the detector across the sheet in response to said signals.

14. The method of claim 13 further including the step of combining the indications of long-term variance and variance in the direction of detector movement to derive an indication of total variance over the sheet area over the total region scanned by the detector.

15. The method of claim 14 further including the step of combining the indications of long-term variance in the machine direction and total variance to provide an indication of short-term variance in the machine direction.

16. The method of claim 14 further including the step of combining the indications of variance in the direction of movement of the detector across the sheet with the total machine direction and long-term machine direction variances to provide an indication of cross machine direction variance.

17. The method of claim 12 wherein the indication of long-term machine direction variance is derived by computing the variance of the average property value resulting from each scan.

18. A method of determining the variance of a property of a sheet moving in a machine direction comprising; while the sheet is moving, detecting a function of the property at a plurality of zones across the moving sheet at each of several displaced locations along the moving sheet, and deriving from the functions an indication of total variance of the property in the machine direction.

19. The method of claim 18 further including the step of deriving from the functions an indication of long-term variance in the machine direction.

20. The method of claim 19 further including the step of combing the indications of total and long-term variances in the machine direction to derive an indication of short-term machine direction variance.

21. The method of claim 18 wherein total variance in the machine direction is derived by computing variance in each zone over the several locations, and averaging the variance for each zone.

22. A method of determining the variance of a property of a sheet moving in a machine direction comprising; while the sheet is moving, detecting the average value of the property at each of a plurality of different locations along the moving sheet in the machine direction, and calculating the variance of said average values to provide an indication of the long-term variance of the property in the machine direction.

23. The method of claim 22 wherein the average values are detected in response to translation of a single detector of the property across the sheet at substantially right angles to the sheet edges.

24. The method of claim 23 further including the step of deriving an indication of the variance over the region scanned by the detector of the property for each scan of the detector.

25. The method of claim 24 further including the steps of averaging the variance indications over the scanned region, and combing the average of the variance indications with the long-term machine direction variance to obtain a measure of total variance.

26. A method of determining the variance of a property of a sheet moving in a machine direction comprising detecting the average value of the property at each of a plurality of different locations along the moving sheet in the machine direction, and calculating a function indicative of the sum of the squares of said average values to provide an indication of the long-term machine direction variance of the property in the machine direction.

27. The method of claim 26 wherein the average values are detected by translating a single detector of the property a plurality of times across the moving sheet at substantially right angles to the sheet edges.

28. A method of performing a statistical analysis of a property of a sheet moving in a machine direction comprising scanning a detector of the property a plurality of times at substantially right angles to the edges of the moving sheet whereby the detector derives a response indicative of the property in the machine and cross sheet directions, deriving a signal indicative of a function of the response for each of a plurality of cross sheet zones, each of said zones extending longitudinally in the machine direction, and accumulating the squares of a function of the derived signals for the zones over several scans to derive an indication of a variance function of the property in at least one of said directions.

29. The method of claim 28 wherein the accumulating step includes separately accumulating squares of a function of the signals indicative of the response for each of the zones over several scans.

30. A method of performing a statistical analysis of a property of a sheet moving in a machine direction comprising scanning a detector of the property a plurality of times at substantially right angles to the edges of the moving sheet whereby the detector derives a response indicative of the property in the machine and cross sheet directions, deriving a signal indicative of a function of the response for each of a plurality of cross sheet zones, each of said zones extending longitudinally in the machine direction in response to the signals derived from several scans of the gauge deriving first and second signals respectively indicative of long term machine direction variance of the property and at least another variance function of the property, and algebraically combing the values of said first and second signals for deriving an indication of short-term machine direction variance of the property.

31. A method of performing a statistical analysis of a property of a sheet moving in a machine direction comprising measuring the property at a plurality of cross sheet zones of the moving sheet, each of said zones extending longitudinally in the machine direction, performing the measurement in each zone at several displaced regions along the sheet length of the moving sheet, deriving a first group of signals indicative of a function of the value of the measured property at the locations where the measurement is performed, separately accumulating the signals for each of the zones to derive a second group of signals indicative of a function of the property, whereby a different signal of the second group is derived for each of the zones, and combining the signals of the second group for the different zones to provide an indication of a variance function of the property.

32. The method of claim 31 wherein the property is measured by scanning a detector for the property several times in a direction between the edges of the moving sheet.

33. A method of determining the variance of a property of a sheet moving in a machine direction comprising; while the sheet is moving, detecting a function of the property at a plurality of zones across the moving sheet at each of several displaced locations along the moving sheet, and deriving from the functions an indication of a variance of the property in the machine direction.

34. The method of claim 33 wherein the variance indication is long term machine direction variance.

35. The method of claim 34 wherein the function of the property is detected by scanning a gauge for detecting the property a plurality of times in the direction between the edges of the moving sheet a plurality of times.

36. A method of statistically analyzing a property of a longitudinally translating sheet in respond to an output signal derived from a gauge for the property, comprising scanning the gauge in a direction between the edges of the moving sheet a plurality of times, said gauge deriving an indication of the property from each of a multiplicity of different cross sheet zones running in the direction of sheet translation, storing in a computer means signals indicative of the response of the gauge for the different zones and for at least some of the scans, and calculating in the computer means a variance function of the sheet property in response to the stored signals for the different zones and some of the scans.

37. A method of performing a statistical analysis of a property of a sheet comprising measuring the property at a plurality of cross sheet zones of the sheet, each of said zones extending longitudinally in the machine direction, performing the measurement in each zone at several displaced regions along the sheet length of the sheet, deriving a first group of signals indicative of a function of the value of the measured property at the locations where the measurement is performed, separately accumulating the signals for each of the zones to derive a second group of signals indicative of a function of the property, whereby a different signal of the second group is derived for each of the zones, and combining the signals of the second group for the different zones to provide an indication of a variance function of the property.

38. A system for computing a variance function of a property of a sheet moving in a machine direction, comprising means for deriving signals indicative of the property, said signals being derived from a plurality of zones across the moving sheet and at several locations along the moving sheet, means responsive to the signals for computing a response indicative of the average value of the property at each location along the sheet, and means responsive to said computing means for calculating the variance of the responses to derive an indication of long term machine direction variance.

39. The system of claim 38 further including means responsive to the signals for computing a response indicative of the variance of the property in each zone across the sheet for the several locations and means responsive to said last named computing means for calculating the average of the variance responses to provide an indication of total machine direction variance.

40. The system of claim 39 further including means responsive to both said calculating means for subtracting one of said variance indications from the other variance indication to derive a measure of short-term machine direction variance.

41. The system of claim 39 wherein said signals are derived in response to scanning a single detector of the property across the sheet several times, one at each of said locations, and means responsive to the scanned detector for calculating the variance of each profile derived by scanning the detector.

42. The system of claim 41 further including means responsive to all of said calculating means for combining profile variance with total machine direction and long-term machine direction variance to provide an indication of cross direction variance of the property.

43. The system of claim 41 further including means responsive to a pair of said calculating means for combining the indications of cross machine variance and total machine direction variance to provide an indication of total variance.

44. The system of claim 41 further including means responsive to a pair of said calculating means for combining the indications of long-term machine direction variance and profile variance to provide an indication of total variance.

45. A system for computing a variance function of a property of a sheet in response to signals indicative of the property derived from a plurality of zones across the sheet and at several locations along the sheet comprising means responsive to the signals for computing a response indicative of the variance of the property for each zone across the sheet for the several locations and means responsive to said computing means for calculating the average of the responses to derive an indication of total machine direction variance.

46. A system for computing a variance function of a property of a sheet moving in machine direction comprising a detector for the property, means for scanning said detector at substantially right angles to the edges of the sheet, said detector being scanned across the moving sheet several times, means responsive to said detector for deriving an indication of the average profile value of the property for each of said scans, and means responsive to said deriving means for calculating the variance of the average profile values to provide an indication of long-term machine direction variance of the property.

47. The system of claim 46 further including means responsive to the detector for deriving an indication of profile variance, and means responsive to both said deriving means for combining the variance indications of profile and long-term machine direction to provide an indication of total variance of the property.

48. The system of claim 47 further including means responsive to indications indicative of machine direction variance and profile variance for deriving an indication of cross machine direction variance.

49. The system for computing a variance function of a property of a sheet moving in a machine direction comprising a detector for the property, means for scanning said detector across the moving sheet at substantially right angles to the sheet to derive a signal indicative of a profile of the property, said detector being scanned several times, a memory responsive to the profile signals, said memory including means for storing signals indicative of the property at each of a plurality of zones across the sheet for the profile signal derived in response to each scan of said detector, and means responsive to and combining the stored signals for computing a first response indicative of a first machine direction variance function of the property.

50. The system of claim 49 wherein said computing means includes means for computing a second response indicative of a second machine direction variance function of the property, and means for combining said responses to derive an indication of cross direction variance of the property.

51. The system of claim 50 wherein the first and second responses are respectively indicative of short-term machine direction variance and profile variance.

52. The system of claim 49 wherein said computing means includes means for computing a second response indicative of a cross direction variance function of the property, and means for combining said responses to derive an indication of total variance of the property.

53. The system of claim 52 wherein the first and second responses are indicative of long-term machine direction variance and profile variance, respectively.

54. The system of claim 52 wherein the first and second responses are indicative of total machine direction variance and cross direction variance.

55. The system of claim 49 wherein said computing means includes: means for computing an indication of the variance of the stored signals for each individual zone over the several scans, and means responsive to said last named means for averaging the variance indications to derive a measure of total machine direction variance.

56. The system of claim 49 wherein said computing means includes: means for computing an indication of the average of the signals for the plural zones of each profile, and means responsive to said last named means for computing the variance of said average indications to derive a measure of total long-term machine direction variance.

57. A system for computing a variance function of a property of a sheet moving in a machine direction in response to signals indicative of the property derived from measurements made at a plurality of zones across the moving sheet and at several locations along the moving sheet comprising means responsive to the signals for computing a response indicative of the average value of the property at each of several locations along the sheet, and means responsive to said computing means for calculating a function indicative of the sum of the squares of said average values to derive an indication of long-term machine direction variance.

58. The system of claim 57 further including means responsive to the signals for computing another response commensurate with a function indicative of the sum of the squares of the property in each zone across the sheet for the several locations, and means responsive to said last named computing means for calculating the average of each of said another responses to provide an indication of total machine direction variance.

59. The system of claim 58 further including means responsive to both said calculating means for subtracting one of said variance indications from the other variance indication to derive a measure of short-term machine direction variance.

60. The system of claim 58 wherein said signals are derived in response to a single detector of the property scanning across the sheet several times, once at each of said locations, and means responsive to the scanned detector for calculating a function indicative of the sum of the squares of the response of each profile derived by scanning the detector.

61. The system of claim 60 further including mans responsive to all of said calculating means for combining profile variance with total machine direction and long-term machine direction variance to provide an indication of cross direction variance of the property.

62. The system of claim 51 further including means responsive to a pair of said calculating means for combining the indications of long term machine direction variance and profile variance to provide an indication of total variance.

63. The system of claim 60 further including means responsive to a pair of said calculating means for combining the indications of cross machine variance and total machine direction variance to provide an indication of total variance.

64. A system for computing a variance function of a property of a sheet moving in machine direction comprising a detector for the property, means for scanning said detector at substantially right angles to the edges of the sheet, said detector being scanned across the moving sheet several times, means responsive to said detector for deriving an indication of the average profile value of the property for each of said scans, and means responsive to said deriving means for calculating a function indicative of the sum of the squares of the average profile values to provide an indication of long-term machine direction variance of the property.

65. Apparatus for performing a statistical analysis of a property of a sheet moving in a machine direction, comprising a detector of the property, means for scanning the detector substantially at right angles to the edges of the moving sheet, whereby the detector is adapted to derive a response indicative of the property in the machine and cross sheet directions, said detector being scanned a plurality of times, means responsive to the detector for deriving a signal indicative of a function of the response for each of a plurality of cross sheet zones, each of said zones extending longitudinally in the machine direction, and means responsive to the signal deriving means for accumulating the squares of a function of the derived signals for the zones over several scans to derive an indication of a variance function of the property in at least one of said directions.

66. Apparatus for performing a statistical analysis of a property of a sheet moving in a machine direction with a detector of the property adapted to be scanned a plurality of times substantially at right angles to the edges of the moving sheet, whereby the detector is adapted to derive a response indicative of the property in the machine and cross sheet directions, comprising means responsive to the detector for deriving a signal indicative of a function of the response for each of a plurality of cross sheet zones, each of said zones extending longitudinally in the machine direction, means responsive to the signal deriving means for accumulating the derived signals for the zones over several of the scans to derive first and second signals respectively indicative of long-term machine direction variance of the property and at least another variance function of the property, and means algebraically combining the values of said first and second signals for deriving an indication of short-term machine direction variance of the property.

67. The apparatus of claim 66 wherein said signal accumulating means includes means for deriving the second signal as indicative of a total variance function.

68. Apparatus for performing a statistical analysis of a property of a sheet in response to measurements of the property made at a plurality of cross sheet zones, each of said zones extending longitudinally in the machine direction, said measurements being performed in each zone at several displaced regions along the length of the sheet, comprising means responsive to the measurements for deriving a first group of signals indicative of a function of the value of the property measured at each of the locations where the measurement is performed, means responsive to the first group of signals for separately accumulating the signals for each of the zones to derive a second group of signals indicative of a function of the property, whereby a different signal of the second group is derived for each of the zones, and means combining the signals for the different zones of the second group for deriving an indication of a variance function of the property.

69. The apparatus of claim 68 wherein said sheet is moving in a machine direction and further including a detector for the property, said detector being responsive to the moving sheet for deriving a response indicative of the measured sheet property, and means for scanning the detector in a direction between the edges of the moving sheet.

70. A system for computing a variance function of a property of a sheet moving in a machine direction comprising a detector for the property, means for scanning said detector across the moving sheet at substantially right angles to the sheet edges to derive a signal indicative of a profile of the property, said detector being scanned several times, a memory responsive to the profile signals, said memory including means for storing signals indicative of the property at each of a plurality of zones across the sheet for the profile signal derived in response to each scan of said detector, and means responsive to and combining the stored signals for computing a response indicative of a variance function of the property.